INVENTOR.
JOHN W. GRAY

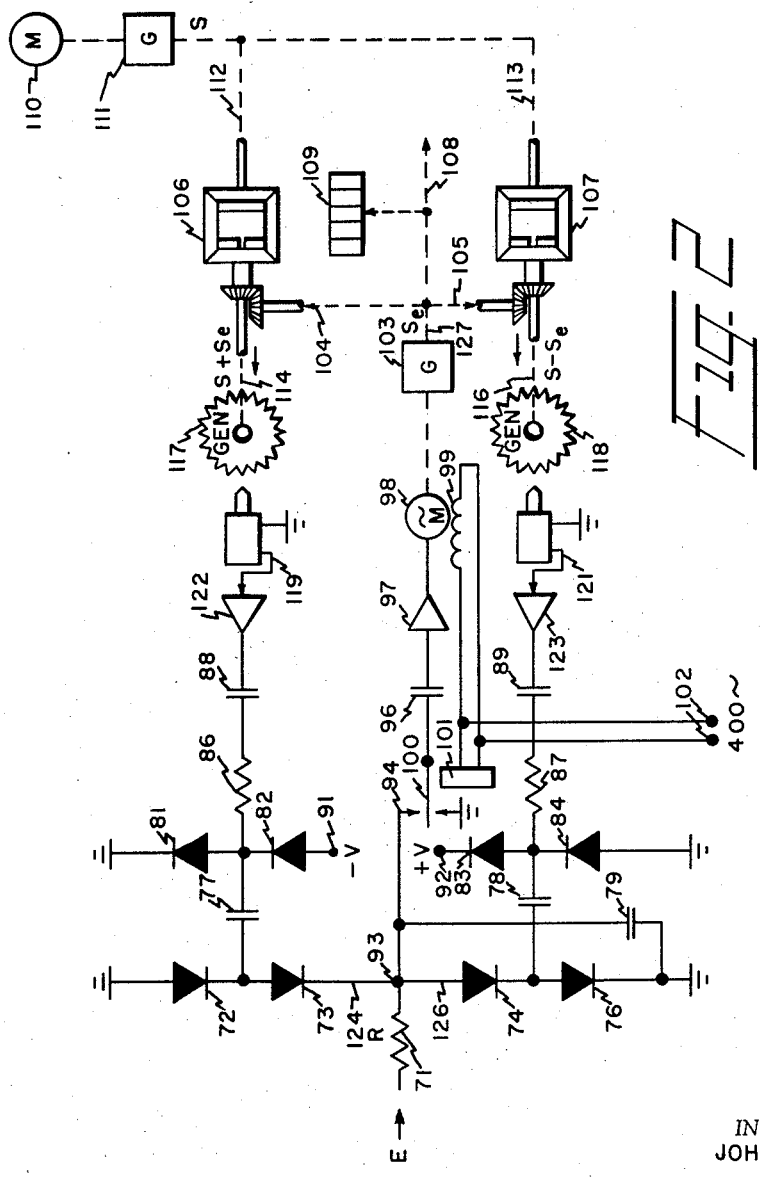

United States Patent Office 2,898,531
Patented Aug. 4, 1959

2,898,531

MOTOR DIFFERENTIAL FREQUENCY INTEGRATOR

John W. Gray, Pleasantville, N.Y., assignor to General Precision Laboratory Incorporated, a corporation of New York Application December 31, 1956, Serial No. 631,928

14 Claims. (Cl. 318—70)

This invention relates to electromechanical integrators and more specifically to integrators having a variable direct potential input and a mechanical shaft position output.

Integration is easily accomplished with poor or fair accuracy by many well-known methods. In fact, any rate servomechanism having output shaft position-indicating means is an integrator. As one example a motor-generator with direct current input and negative feedback employing a direct-current tachometer is a direct-current rate servomechanism, and if a revolution counter be attached to the motor shaft its angular deflection at any time is indicated and is the integral of the input potential. Thus the motor-generator circuit is an integrator. Such an integrator, however, has several sources of error and is capable of only medium accuracy. Moreover, its accuracy is affected by ambient temperature changes. Rate servomechanisms of this kind are frequently employed as shaft speed controllers, and are not precision instruments.

The rate servomechanism of this invention, however, is a precision instrument, and the integrator incorporating it integrates with high accuracy, and is insensitive to temperature changes while at the same time using simple and non-critical components. The invention employs two similar capacitor frequency counters of the type disclosed in Patent Number 2,584,866 and makes use of a capacitor and two diodes in a feedback circuit to measure the frequency of an applied alternating current or varying direct-current voltage.

In the present invention the input signal is applied differentially to two such capacitor-counter feedback circuits. The output in the form of a frequency difference is converted to the form of a shaft speed differential, and the device is a highly accurate rate servomechanism for direct current inputs. By applying a revolution counter, or any device for indicating angular deflection, to the output shaft, the integral of shaft speed is obtained in terms of revolutions or angle, and is proportional to the integral of the input signal.

One purpose of this invention is to provide a highly accurate integrator of a varying direct current having shaft position as its output quantity.

Another purpose of this invention is to provide a rate servomechanism having an output shaft speed proportional to an input direct voltage.

A further understanding of this invention may be secured from the detailed description and drawings, in which:

Figure 2 is a schematic diagram of a second embodiment of the invention employing a pair of synchronous generators.

Figure 1:
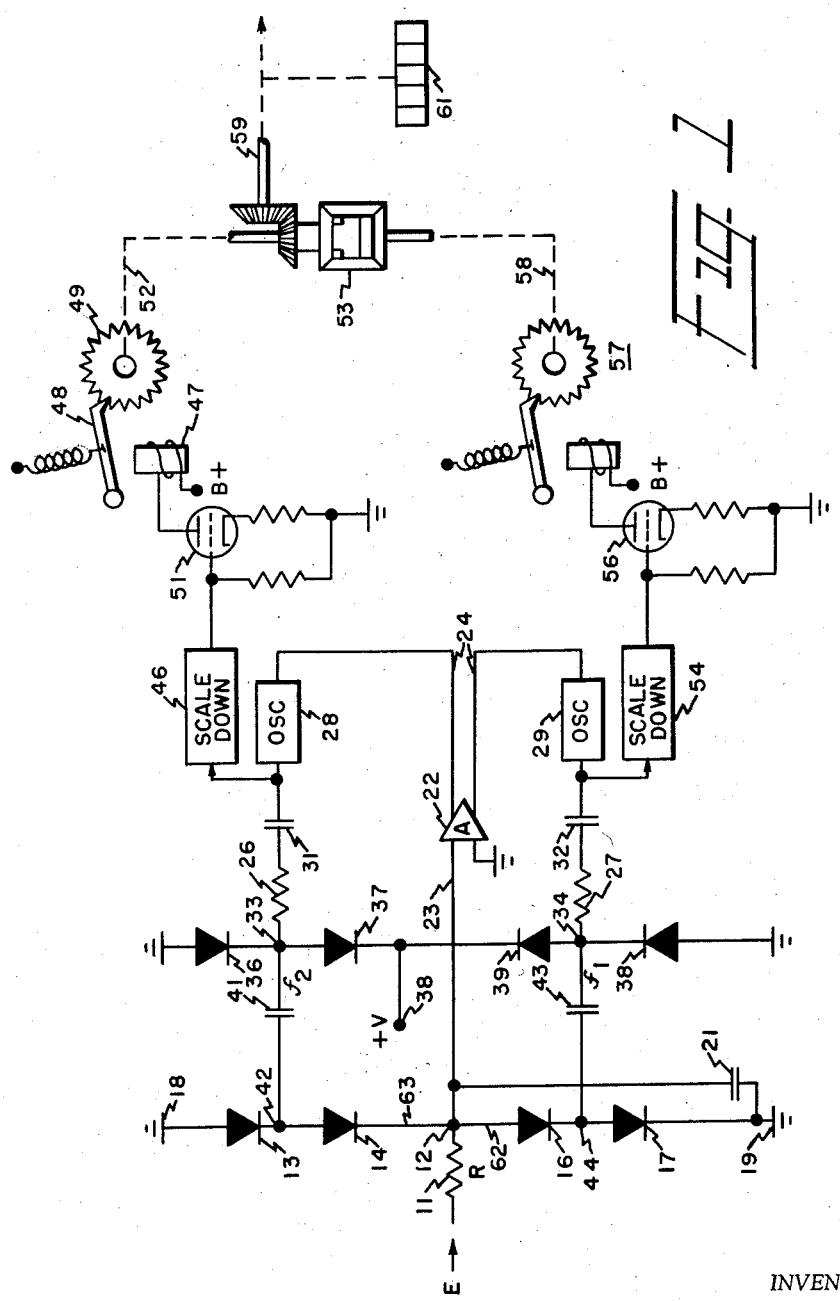
Figure 1 is a schematic diagram of an embodiment of the invention employing a pair of ratchet motors.

Referring now to Fig. 1, an input signal potential E is applied through a decoupling resistor 11 to junction 12. The input signal potential E may be a variable direct potential of either polarity or a changing polarity. In place of employing input signal voltage E an input signal current I may be applied directly to junction 12. The junction 12 is the center junction of a group of four measuring diode rectifiers 13, 14, 16 and 17 connected in series aiding in a closed ring, diodes 13 and 17 being connected to a common conductor which is here conventionally indicated as a ground connection, and diodes 14 and 16 being connected to junction 12. Junction 12 is also connected to a grounded smoothing capacitor 21 and to a differential direct-coupled amplifier 22. This amplifier has a single input indicated by the single lead 23 but has a dual or push-pull output indicated by the two leads 24.

Amplifier 22 may have any of the several common forms satisfying these requirements. A simple and satisfactory form, for example, is that described and depicted in volume 18 of the Radiation Laboratory Series in Fig. 11.67, on page 484.

The output conductors 24 of amplifier 22 apply the push-pull amplifier output potentials to two identical oscillators 28 and 29. These oscillators may be of any voltage-controlled type, and the frequency of the output need not vary linearly with the input frequency. Gas diode relaxation oscillators are suitable but Eccles-Jordan free-running multivabrators are preferred. The latter instrument is described in volume 1 of the Radiation Laboratory Series on page 497 and is depicted in Fig. 13.13, except that in the present application the control voltage is applied to the grid bias resistor.

The oscillator output voltages are applied through large coupling capacitors 31 and 32 and resistors 26 and 27 to the junctions 33 and 34 of two similar voltage limiters. One limiter consists of two diode rectifiers 36 and 37 connected in series with a common junction at 33. The anode of diode 36 is grounded and the cathode of diode 37 is connected to a source of fixed positive potential V represented by terminal 38. The value of V may, for example, be of the order of 50 or 100 volts. This potential forms a part of the scale factor of the instrument, so must be appropriately controlled. The other limiter consists of two diode rectifiers 38 and 39 in series with 34 as their common junction. The anode of diode 38 is grounded and the cathode of diode 39 is connected to terminal 38.

The limiting diodes 36, 37, 38 and 39 and also the measuring diodes 13, 14, 16 and 17 may be of the silicon or germanium or of any other crystal or semiconductor type, or may be of the selenium or electronic tube types. However, the properties of silicon junction diodes are highly advantageous and this type of rectifier is preferred at all of the eight diode positions.

The junction 33 is connected to a measuring capacitor 41, the other side of which is connected to the junction 42 between measuring diodes 13 and 14. Likewise junction 34 is connected to measuring capacitor 43, the other side of which is connected to the junction 44 between diodes 16 and 17. The measuring capacitors 41 and 43 must be small, so that their input sides will be charged to their full limit voltages and the output sides will be discharged to a substantially constant voltage level well within the duration of the flat part of the charging half cycle. This requires that the product of a particular capacitance and the forward resistance of a measuring diode be substantially less than the time of one-half cycle of the charging potential. The capacitances of capacitors 41 and 43 should be equal and should be precisely known, as these capacitance values form parts of the scale factor of the instrument.

Oscillator 28 is also connected to a device for converting frequencies to an equivalent shaft speed. It may be connected through a scale-down circuit 46 if the frequency is higher than the permissible frequency of the conversion device, this scale-down circuit 46 consisting simply of one or more scale-of-two circuits in tandem. The conversion device briefly consists of a ratchet motor having a non-polarized solenoid 47, armature 48 and a ratchet wheel 49. It is operated through a triode amplifier 51 which not only amplifies the alternating input but renders the current applied to solenoid 47 unidirectional relative to ground. The shaft 52 of the ratchet wheel is connected to a gear differential 53.

In place of the ratchet motor and triode a two-phase or three-phase synchronous motor, of the type which can operate over a wide range of frequencies and speeds, may be employed, with appropriate phase-splitting circuits.

Oscillator 29 is connected to identical apparatus consisting of a scale-down circuit 54, if required, a triode amplifier-rectifier 56, and a ratchet motor 57. The output shaft 58 thereof is connected to a second input terminal of the differential 53.

The third terminal 59 of the differential is its output terminal and to it is connected a revolution counter 61.

In the operation of this device a direct potential E is applied to terminal 12 through resistor 11. When terminal 12 departs from ground potential it applies an input potential to high-gain amplifier 22, which in turn applies push-pull output potential to the control circuits of oscillators 28 and 29, causing them to have output frequencies which differ proportionally to the magnitude of the amplifier peak-to-peak output. The oscillator output potentials are large enough that they are limited by the limiters at junctions 33 and 34 so that square or trapezoidal potentials having definite peak-to-peak values are applied to measuring capacitors 41 and 43.

The combination consisting of capacitor 43 and diodes 16 and 17 constitutes a capacity frequency counter as described in Patent Number 2,584,866 as previously mentioned. Briefly, it is a device which measures, in terms of the current $i_1$ flowing in conductor 62, the frequency $f_1$ of the alternating potential applied to the right side of capacitor 43. The equation is $$i_1 = f_1 V C_1 \qquad (1)$$

in which $C_1$ is the capacitance of capacitor 43.

The combination consisting of capacitor 41 and diodes 13 and 14 operates in exactly the same way on the frequency $f_2$ applied to the right side of capacitor 41, measuring it in terms of current in conductor 63, so that $$i_2 = f_2 V C_2 \qquad (2)$$

in which $C_2$ is the capacitance of capacitor 41.

Let it be assumed that the two capacity frequency counters are identical and that the feedback circuits have attained a null condition. Then, when the input signal is zero, $i_1$ must equal $i_2$ and, from Equations 1 and 2, $f_1$ must equal $f_2$. The potential of junction 12 is that of ground and no signal is applied through conductor 23. When, however, there is, for example, a small positive variable input E, it adds a small current to the junction 12 having the value $$i = \frac{E}{R} \qquad (3)$$

in which R is the resistance of resistor 11. The current equation at junction 12 then becomes $$i = i_2 - i_1 \qquad (4)$$

Substituting values from Equations 1, 2 and 3, $$E = RVC(f_2 - f_1) \qquad (5)$$

That is, when a signal E exists the two frequencies $f_2$ and $f_1$ are different and the difference is proportional to the input signal E. The potential of junction 12 is made to be vanishingly small by the action of high-gain amplifier 22, which controls the difference of the frequencies $f_1$ and $f_2$.

This frequency difference is measured by converting $f_2$ to a corresponding speed of rotation of shaft 52 and converting $f_1$ to a corresponding speed of rotation of shaft 58. Directions of rotations at differential 53 are so arranged that this differential always subtracts the two input shaft speeds, the shaft speed difference being derived at shaft 59. This shaft speed is therefore an exact measure of the magnitude of the input signal E at any instant in accordance with Equation 5.

Since shaft position is the integral of shaft speed the shaft angular position difference measured from any selected shaft position, as indicated by counter 61, represents the integral of the input signal E. It therefore may be said that shaft angular deflection $$\theta = k \int E \, dt + C \qquad (6)$$

The scale factor $k$, or ratio of the output shaft positional difference to the integral of the input potential, is determined by the factor RVC. Adjustment of the potential V is a convenient way of adjusting the scale factor.

Figure 2 depicts a second embodiment employing the same principle. Since it does not employ ratchet motors it does not have the intermittent output shaft operation which is possible in Fig. 1. The circuit of Fig. 2 can use low-accuracy parts throughout but secures high-accuracy integration. The measuring resistor 71 with measuring diodes 72, 73, 74 and 76, small measuring capacitors 77 and 78, and smoothing capacitor 79 are all identical in design and function with those of Fig. 1. The limiting diodes 81, 82, 83 and 84 are similar and are isolated by resistors 86 and 87 and large capacitors 88 and 89, but the limiting diodes are returned to equal positive and negative potential V terminals 91 and 92. The reason for this is the possibility of a small leakage through capacitors 77 and 78. By using voltages V of opposite polarities as shown, the leakages are placed at those parts of the cycle where they do not impair accuracy, namely, when the polarity is such that the grounded diode is conducting.

Measuring junction 93 is connected to one contact 94 of a chopper, the other being grounded. The armature 100 is connected through a capacitor 96 to a high-gain alternating-current amplifier 97 which operates a two-phase low-inertia motor 98. The other phase winding 99 of this motor and also the chopper solenoid 101 are connected to the same alternating current power terminals 102. The motor 98 is connected through step-down gears 103 to input terminals 104 and 105 of two differentials 106 and 107 and also to an output shaft 108 which is connected to a counter 109. A second motor 110, which runs continuously but which need not have precise speed regulation, rotates the other two inputs 112 and 113 of the two differentials 106 and 107 at identical speeds through a step-down gear 111. The differential outputs at shafts 114 and 116 operate two synchronous generators 117 and 118 which may be of the instrument type termed tone wheels. The synchronous generator outputs on conductors 119 and 121 are amplified in amplifiers 122 and 123. The amplified outputs are clipped by diodes 81, 82, 83 and 84 and applied to the cycle counting capacitors 77 and 78.

In operation, with no input signal the current in resistor 71 is zero, the potential of junction 93 is that of ground, and no signal is applied to amplifier 97, so that motor 98 is stationary. The reduced shaft speed S of motor 110 which runs continuously, thus constitutes the only input to the differentials 106 and 107. Speed S thus appears at both shafts 114 and 116 so that the outputs of generators 117 and 118 have equal speed and equal output frequencies. These frequencies as counted by capacitors 77 and 78 result in equal currents in conductors 124 and 126.

When a signal E is applied, a positive or negative potential appears on contact 94. This is interrupted by the vibrating contact 100 so that amplifier 97 applies an alternating potential to motor 98 with the direction of rotation depending on the sense of the input signal. This results in a speed of shaft 127 of $S_e$ proportional to the amplifier input. The arrangements of differentials 106 and 107 are such that this speed is added to the speed of shaft 112 to make shaft 114 speed $S+S_e$ but subtracted from the speed of shaft 113 to make the speed of shaft 116 $S-S_e$. There will therefore be a frequency difference between outputs 119 and 121 resulting in a current difference at conductors 124 and 126. At equilibrium this current difference will just equal the current in resistor 71, or $E/R$. The speed of shaft 108 will also be proportional to this difference while the indication of counter 109 will be proportional to the integral thereof in accordance with Equations 5 and 6.

What is claimed is:

1. A rate servomechanism comprising, a pair of similar capacity and diode frequency counters, each having a feedback loop containing an alternating current generator, portions of the feedback loops being in common, said common portion including an amplifier, means applying a direct-current input signal to said common portion, means deriving from the signals in the non-common portions of said two feedback loops two mechanical shaft speeds representative of the respective signals thereof, and means subtracting said two mechanical shaft speeds to form a difference shaft speed representative of the amount and sense of the difference thereof and proportional to said direct-current input signal.

2. An integrator comprising a rate servomechanism in accordance with claim 1 including means for deriving from said difference shaft a quantity representative of the time integral of the speed thereof.

3. A rate servomechanism comprising, a pair of similar capacity and diode frequency counters having similar feedback loops each containing an alternating current generator, the outputs of said generators being voltage limited at the same selected direct voltage relative to ground, portions of said feedback loops being in common, said common portion containing an amplifier, means applying a direct-current input signal to said common portion, means deriving from the signals in the non-common feedback loops two mechanical shaft speeds representative of the output frequencies of said two alternating current generators, and means subtracting said two mechanical shaft speeds to form a difference shaft speed representative of the amount and sense of the difference thereof and proportional to said direct current input signal multiplied by said selected limiting direct voltage.

4. An integrator comprising a rate servomechanism as set forth in claim 3 including means for deriving from said difference shaft a quantity representative of the time integral of the speed thereof.

5. A rate servomechanism comprising, a pair of similar capacity and diode frequency counters having similar feedback loops each containing a direct-potential controlled oscillator, the output of each said oscillator being voltage-limited at the same selected direct voltage, portions of said feedback loops being common and constituting a common portion containing an amplifier having a single input and a push-pull output, means applying a direct-current input signal to said amplifier input, means deriving from the outputs of said oscillators mechanical shaft speeds representative of the frequencies thereof, and means subtracting the speeds of said mechanical shafts to form a difference shaft speed the amount of which is representative of the amount of said speed difference and the sense of which is representative of the sense of said speed difference, said difference shaft speed also being proportional to said direct-current input signal multiplied by said selected limiting direct voltage.

6. An integrator comprising a rate servomechanism in accordance with claim 5 including an indicator on said difference shaft indicating the integral of the speed thereof.

7. A rate servomechanism comprising, a pair of similar frequency counters, each counter containing a pair of diodes and a feedback loop, each feedback loop also including one of said pair of diodes, a measuring capacitor and a direct-potential-controlled oscillator, a direct-coupled amplifier common to said two feedback loops, means applying a direct-current input signal to said amplifier, a pair of ratchet motors operated from the outputs of said oscillators at speeds proportional to the frequencies thereof, and means subtracting said speeds to form a difference shaft speed representative of the magnitude and sense of said direct-current input signal.

8. An integrator comprising a rate servomechanism in accordance with claim 7 including a counter connected to said difference shaft indicating the integral of the speed thereof.

9. A rate servomechanism comprising, a pair of similar capacity and diode frequency counters having similar feedback loops each containing a synchronous generator, portions of said feedback loops being in common, said common portion including an interrupter inverter an alternating-current amplifier and reversible alternating current motor, means applying a direct-current input signal to said interrupter inverter, a pair of gear differentials, a second motor driving one terminal of each of said pair of gear differentials, a shaft connecting one remaining terminal of each said pair of gear differentials to a respective one of said synchronous generators, and shaft connections from the shaft of said reversible alternating current motor to the remaining terminals of said pair of gear differentials, whereby said synchronous generators are operated at speeds respectively representing the sum and difference of the speeds of said reversible motor and said second motor, and the speed of said reversible motor represents said input signal.

10. An integrator comprising a rate servomechanism in accordance with claim 9 including an indicator on said reversible motor shaft indicating the integral of the speed thereof and representing the integral of said direct-current input signal.

11. A rate servomechanism comprising, a pair of similar frequency counters each containing a pair of measuring diodes, each counter having a feedback loop containing one of said pair of measuring diodes, a measuring capacitor and a synchronous generator, means limiting the voltage output of each of said synchronous generators to the same selected voltage, an interrupter inverter, alternating current amplifier and two-phase motor common to both feedback loops, means applying a direct-current input signal to said interrupter inverter, a second motor, a pair of gear differentials each having one terminal driven by said second motor, a shaft connecting a second terminal of each said gear differential to drive a respective one of said synchronous generators, and shaft connections from said two-phase motor to the remaining terminals of said gear differentials, whereby the speed of said shaft connections is proportional to said direct-current input signal multiplied by said selected voltage.

12. An integrator comprising a rate servomechanism in accordance with claim 11 including a counter connected to said shaft connections indicating the integral of the speed thereof.

13. An integrator comprising, a pair of similar frequency counters each including a feedback loop producing feedback signals proportional to an error signal impressed on a common input thereof, said feedback signals being impressed on said common input in such relative sense as to produce a difference signal, means for impressing an input signal on said common input in opposition to said difference signal to produce said error signal, means for rotating a pair of shafts at speeds which are proportional to the respective signals produced in said feedback loops, and means obtaining a difference shaft speed from said pair of shaft speeds.

14. An integrator comprising, a pair of similar feedback loops each of which includes an alternating current generator the output signal of which has a frequency which is proportional to the magnitude of an error signal impressed on its input, each of said feedback loops further including a capacity diode frequency counter connected to the output of a respective alternating current generator, each of said frequency counters producing an output signal the magnitude of which is proportional to the frequency of the signal impressed on the input thereof, a common input for said feedback loops having an input signal and the difference of said frequency counter output signals impressed thereon and producing said error signal therefrom, means for rotating a shaft at a speed which is proportional to the difference of the frequencies of said alternating current generators, and an indicator operated by said shaft.

References Cited in the file of this patent

UNITED STATES PATENTS

| | | |
|---|---|---|
| 2,230,715 | Cockrell | Feb. 4, 1941 |
| 2,259,958 | Levy | Oct. 21, 1941 |
| 2,389,367 | King | Nov. 20, 1945 |
| 2,418,134 | Mitchell | Apr. 1, 1947 |
| 2,432,140 | Dehmel | Dec. 9, 1947 |
| 2,432,141 | Dehmel | Dec. 9, 1947 |
| 2,693,563 | Hunt | Nov. 2, 1954 |